J. L. PRIBBLE.
DIFFERENTIAL GEAR.
APPLICATION FILED NOV. 29, 1910.
988,662.
Patented Apr. 4, 1911.
3 SHEETS—SHEET 2.
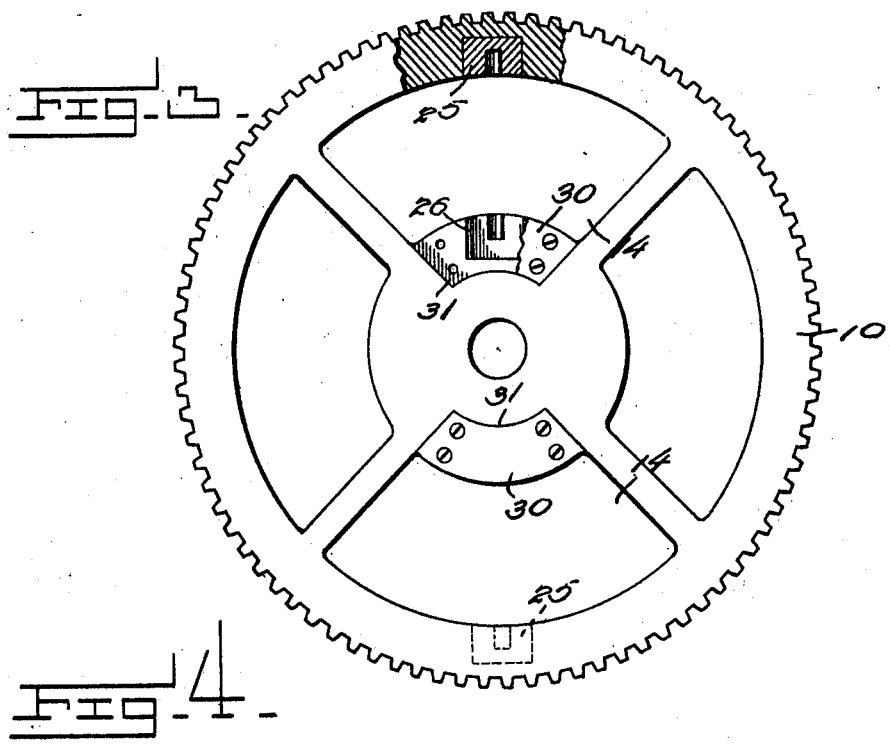
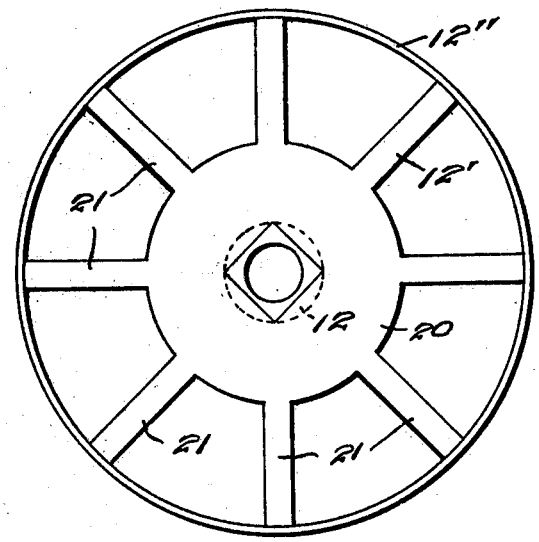
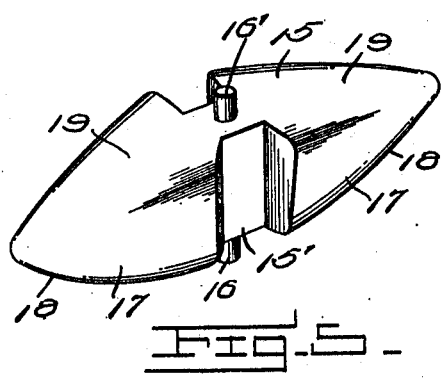
Witnesses
Inventor
J. L. Pribble,
By Harry E. Chandlee
Attorney J. L. PRIBBLE.
DIFFERENTIAL GEAR.
APPLICATION FILED NOV. 29, 1910.
988,662.
Patented Apr. 4, 1911.
3 SHEETS—SHEET 3.
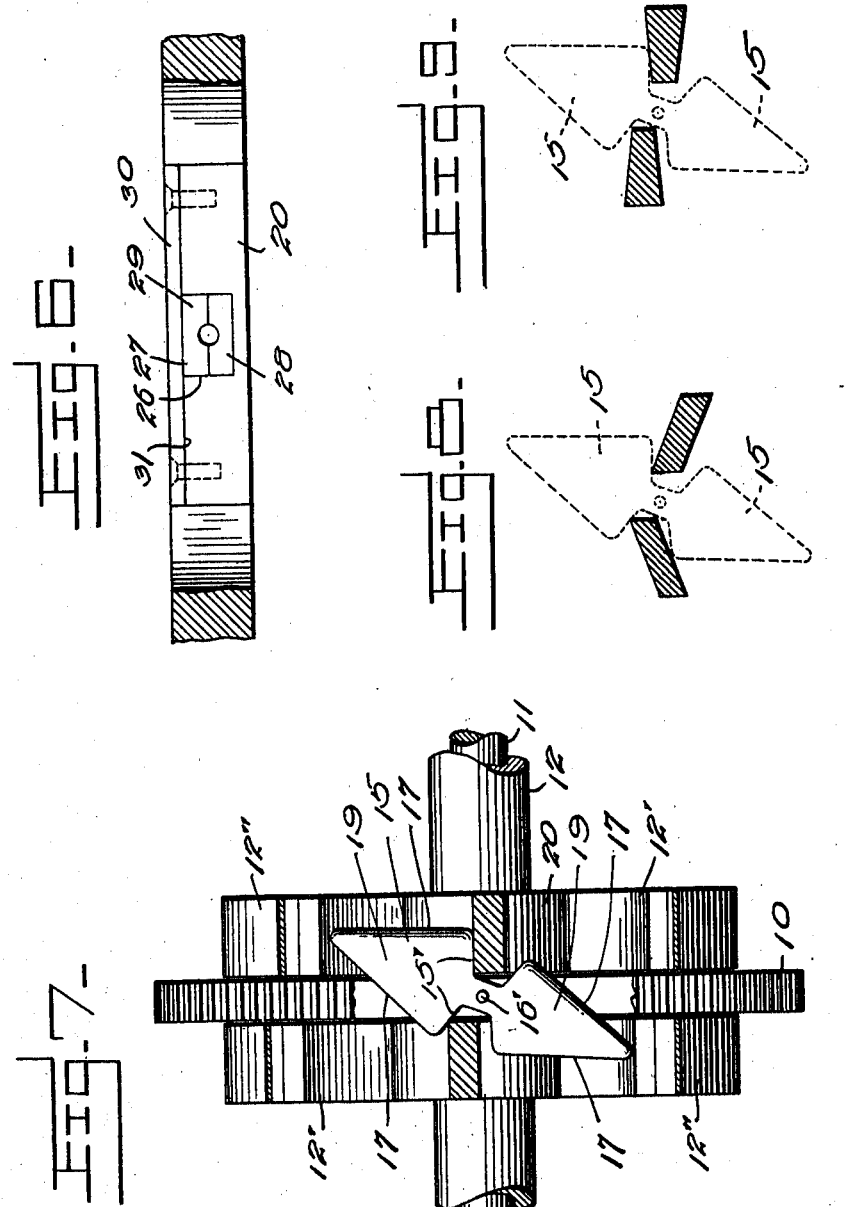
Witnesses
Inventor
J. L. Pribble,
By Harry E. Chandlee
Attorney

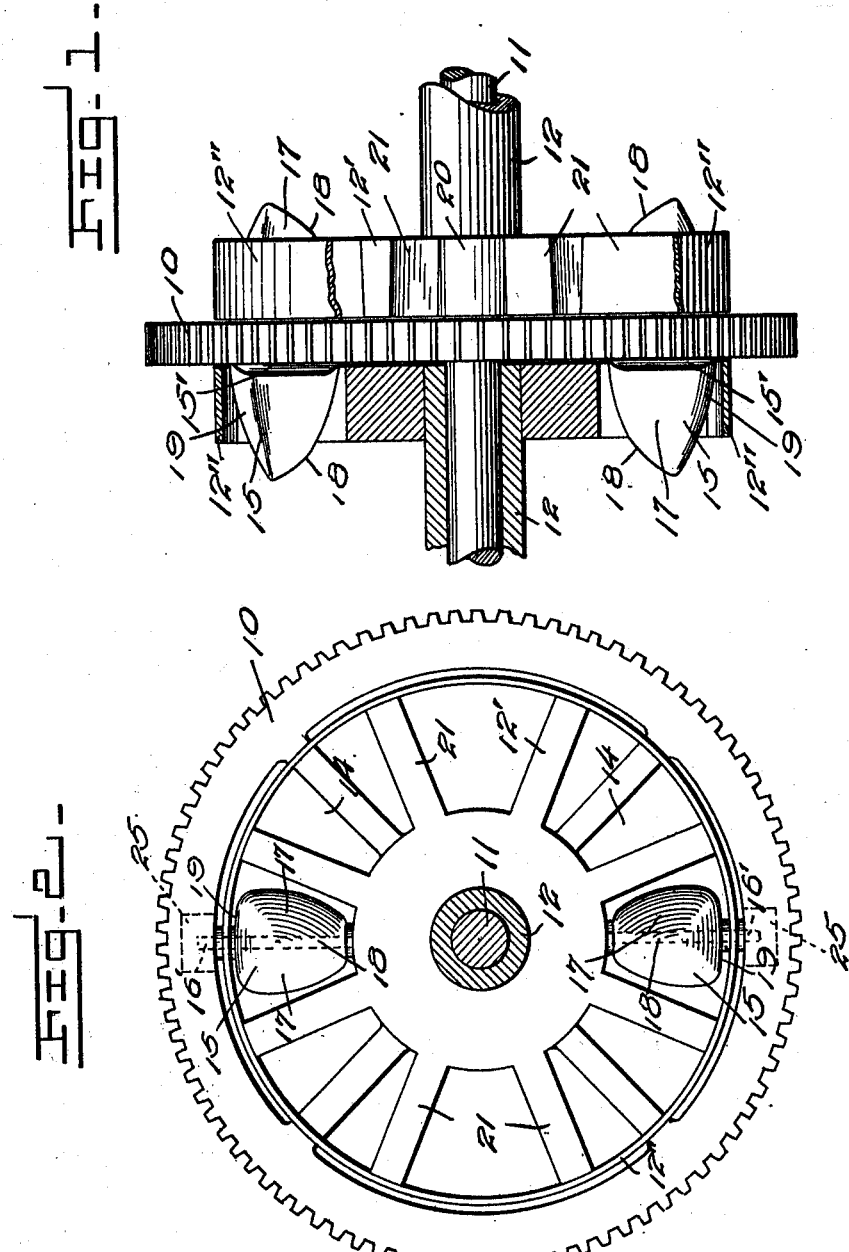

UNITED STATES PATENT OFFICE.

JOHN L. PRIBBLE, OF ENFIELD, VIRGINIA.

DIFFERENTIAL GEAR.

988,662.

Specification of Letters Patent. Patented Apr. 4, 1911.

Application filed November 29, 1910. Serial No. 594,644.

*To all whom it may concern:*

Be it known that I, JOHN LEAKE PRIBBLE, a citizen of the United States, residing at Enfield, in the county of King William and State of Virginia, have invented certain new and useful Improvements in Differential Gear, of which the following is a specification.

This invention relates to differential gears, the object of said invention being to provide a gear of this type which will be simple in construction, efficient in practice and economical to manufacture.

A further object of the invention is to provide means other than a gear wheel for transferring the power from the drive wheel to the driven wheels.

In the drawings: Figure 1 is a view partly in section of the device assembled, Fig. 2 a side elevation of the same, Fig. 3 a detail view of the drive wheel removed, Fig. 4 a similar view of one of the driven wheels, Fig. 5 a perspective view of the transmitting member, Fig. 6 a detail view showing the manner of positioning the two-part bearing, Fig. 7 is a view showing the manner in which the transmitting member contacts with the spokes, Fig. 8 is a sectional view of a modified form of spokes, and Fig. 9 is a sectional view of a spoke which tapers in cross section.

In the drawings: 10 designates the drive wheel which may be driven in any convenient manner. This wheel is mounted upon a shaft 11 which extends within hollow shafts 12 upon which are mounted the driven gears 12′. The gear 10 is provided with openings 14 to receive the rotating transmitting members 15, these transmitting members being secured in position by trunnions 16 and 16′ which are formed integral with said members. The trunnion 16′ is adapted to be inserted within a bronze bearing 25, carried by the wheel, the hub of said wheel being cut away at the point 26 to receive the bearing 27, which is formed in sections 28 and 29. In positioning the trunnions, the trunnion 16′ is inserted within the bearing 25, the trunnion 16 being placed in the groove formed in the section 28. The section 29 is now placed in engagement with the section 28, and a retaining plate 30 positioned within the cut away portion 31, said plate being secured by means of counter-sunk screws, said screws and retaining plate being flush with the wheel.

The transmitting members are substantially oval and are beveled at 17 thus forming the sharp edge 18 and the flattened portion 19, the portion 18 being adapted to extend toward the hub portions of the driven gears; said members being provided with the central cut away portions 15′ the edges of which are beveled. The driven gears consist of the hub portion 20 which is mounted on a hollow shaft and which is provided with a plurality of spokes 21. A suitable band or tire 12″ embraces the end portion of these spokes, said spokes being of such a length as to prevent the transmitting members 15 from contacting with said tires.

When the drive wheel 10 is caused to rotate, and the transmitting member 15 lies at right angles to the same it will be seen that the driven gears 12′ will travel at equal speeds but when the vehicle upon which the device is mounted makes a turn, the off wheel will be allowed to travel at a greater rate of speed than the inside wheel, the transmitting device 15 rotating to permit of the variation in speed of the wheels. Particular attention is called to the peculiar configuration of this member, its beveled portions being so positioned as to allow it to be rotated by the driven gears, the spokes entering the cut away portions 15′ as the member 15 rotates. When the wheels of the vehicle are again allowed to travel at the same rate of speed it will be noted that the power transmitting member 15 will continue to drive the gears 12′ at the same rate of speed. It will be seen from the foregoing, that this construction provides an efficient differential which may be manufactured economically and which may be easily and conveniently repaired.

In the modification shown in Fig. 8, the spokes are rhomboidal in cross-section. It will be noted that a spoke constructed in this manner will facilitate the rotation of the device 15.

In Fig. 9 the spokes are tapered in cross-section and it will be noted that the same may taper toward the drive wheel or from the drive wheel according to the manner in which the driven wheels are placed upon their shafts. The spokes shown in both of these modified forms are so constructed as to offer the least resistance to the transmitting member as the vehicle makes a turn, thus preventing frictional contact between the drive wheel and the transmitting member.

What is claimed is:

1. A differential gear comprising a solid shaft, a drive wheel, mounted upon said solid shaft, hollow shafts on the solid shaft, a plurality of driven wheels adapted to rotate on said hollow shafts, said driven wheels being provided with a plurality of tapered spokes and a revolubly supported member carried by said drive wheel, said member being adapted to engage said spokes.

2. A differential gear comprising a solid shaft, a drive wheel, mounted upon said solid shaft, hollow shafts on the solid shaft, a plurality of driven wheels adapted to rotate on said hollow shafts, said driven wheels being provided with a plurality of tapered spokes and a revolubly supported member carried by said drive wheel, said member being provided with a tapered portion adapted to engage said tapered spokes.

3. A differential gear comprising a drive wheel, driven wheels, said driven wheels being provided with spokes having inclined faces, and rotatively supported transmitting members arranged on said drive wheel, said members being substantially oval and provided with centrally arranged cut away portions, said spokes being adapted to enter said cut away portions the side walls of which are beveled.

4. A differential gear comprising a drive wheel, driven wheels, said driven wheels being provided with spokes, and rotatively supported transmitting members arranged upon said drive wheel, said members being provided with beveled portions adapted to extend toward the hubs of said driven wheels.

In testimony whereof I affix my signature, in the presence of two witnesses.

JOHN L. PRIBBLE.

Witnesses:
M. LOUISE LOWE,
THAD B. SARGEANT.

Copies of this patent may be obtained for five cents each, by addressing the "Commissioner of Patents, Washington, D. C."